United States Patent
Mangold et al.

(10) Patent No.: US 7,276,295 B2
(45) Date of Patent: Oct. 2, 2007

(54) METAL FOIL WITH AN EMBOSSED STRUCTURE FOR USE IN THE PURIFICATION OF EXHAUST GAS AND A TOOL AND METHOD FOR ITS PRODUCTION

(75) Inventors: Christian Mangold, Eschenlohe (DE); Anton Mangold, Garmisch-Partenkirchen (DE)

(73) Assignee: Overland Mangold GmbH, Garmisch-Partenkirchen (DE)

( * ) Notice: Subject to any disclaimer, the term of this patent is extended or adjusted under 35 U.S.C. 154(b) by 339 days.

(21) Appl. No.: 10/345,280

(22) Filed: Jan. 16, 2003

(65) Prior Publication Data

US 2004/0043899 A1    Mar. 4, 2004

(30) Foreign Application Priority Data

| Jan. 16, 2002 | (DE) | ................................ 102 01 481 |
| Jun. 5, 2002 | (DE) | ................................ 102 24 997 |
| Nov. 27, 2002 | (EP) | ................................ 02026515 |

(51) Int. Cl.
*B01J 35/04* (2006.01)
*F01N 3/24* (2006.01)
*B32B 3/28* (2006.01)

(52) U.S. Cl. .................... 428/593; 428/596; 428/603; 428/604; 502/439; 502/527.22; 422/180; 29/890

(58) Field of Classification Search ................ 428/593, 428/603, 604, 596, 608; 422/180; 502/439, 502/527.22; 29/890
See application file for complete search history.

(56) References Cited

U.S. PATENT DOCUMENTS 1,154,254 A * 9/1915 Lachman .................. 29/897.32
2,672,958 A * 3/1954 Pierce ........................ 52/588.1
4,087,034 A * 5/1978 Kikkawa et al. .............. 227/90

(Continued)

FOREIGN PATENT DOCUMENTS

DE          3744265 A1 * 7/1989

(Continued)

*Primary Examiner*—John J. Zimmerman
(74) *Attorney, Agent, or Firm*—Baker & Hostetler LLP

(57) ABSTRACT

The subject matter of the present invention relates to a metal foil with an embossed structure for use in the purification of exhaust gas as well as to a tool and a method for its production. In the direction of the main flow, the metal foil has alternating peaks with ascending flanks and descending flanks and valleys, with the peaks and valleys being divided into rows parallel to the direction of the main flow and with the peaks and valleys of adjacent rows being staggered in the direction of the main flow in such a way that the ascending flanks and the descending flanks of the staggered peaks form a trough which connects the staggered valleys.

40 Claims, 6 Drawing Sheets

U.S. PATENT DOCUMENTS

| | | | |
|---|---|---|---|
| 4,152,302 A * | 5/1979 | Nonnenmann et al. | 502/338 |
| 4,402,871 A * | 9/1983 | Retallick | 156/157 |
| 4,472,358 A * | 9/1984 | Khudenko | 422/141 |
| 4,597,262 A * | 7/1986 | Retallick | 60/274 |
| 4,665,051 A * | 5/1987 | Nonnenmann | 502/439 |
| 4,666,593 A * | 5/1987 | Bosne | 210/150 |
| 5,045,403 A * | 9/1991 | Maus et al. | 428/593 |
| 5,384,100 A * | 1/1995 | Freund | 422/180 |
| 5,567,395 A * | 10/1996 | Okabe et al. | 422/180 |
| 6,057,263 A * | 5/2000 | Takahashi et al. | 502/439 |
| 6,190,784 B1 * | 2/2001 | Maus et al. | 428/593 |
| 6,287,523 B1 * | 9/2001 | Hirohashi et al. | 422/180 |
| 6,534,021 B1 * | 3/2003 | Maus | 422/180 |
| 2003/0072694 A1 * | 4/2003 | Hodgson et al. | 422/180 |

FOREIGN PATENT DOCUMENTS

DE          3844350 A1 *    7/1990

\* cited by examiner

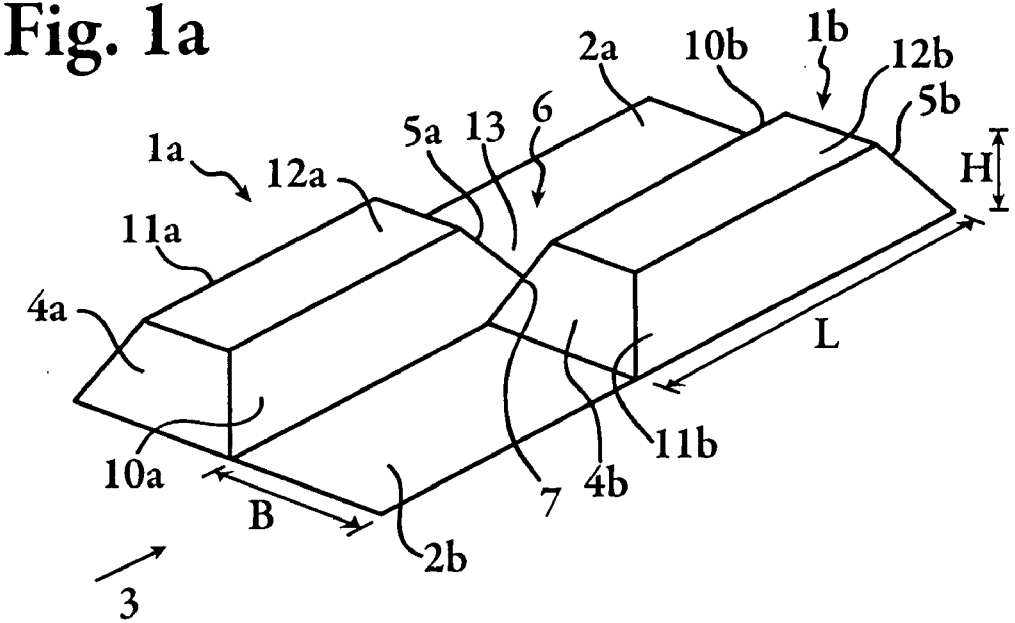
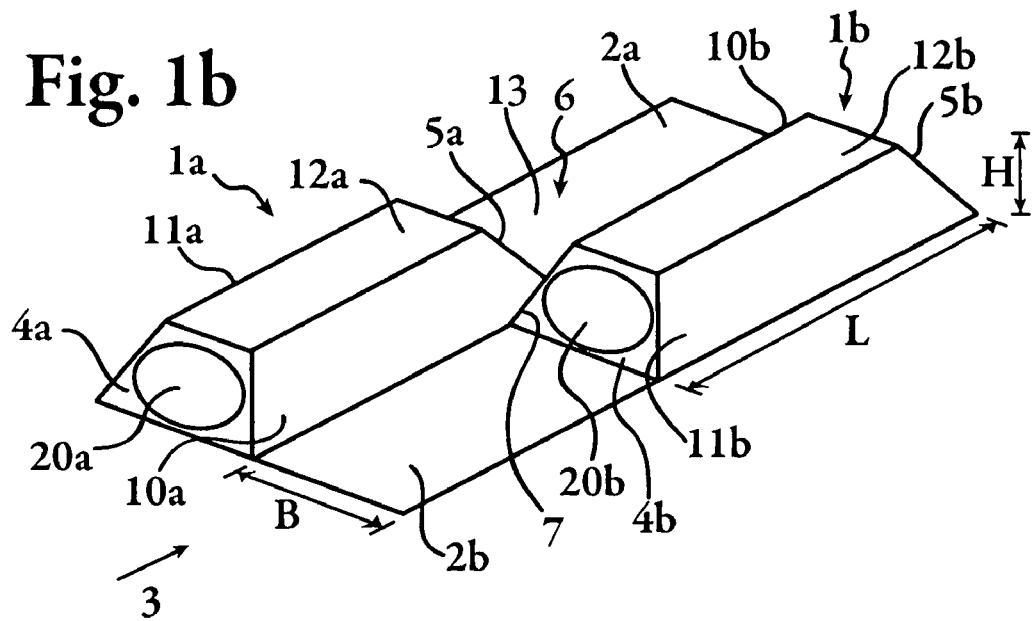

METAL FOIL WITH AN EMBOSSED STRUCTURE FOR USE IN THE PURIFICATION OF EXHAUST GAS AND A TOOL AND METHOD FOR ITS PRODUCTION

FIELD OF THE INVENTION

The subject matter of the present invention relates to a metal foil with an embossed structure for use in the purification of exhaust gas as well as a tool and a method for its production.

BACKGROUND OF THE INVENTION

Structured metal foils of this type are mainly used for catalysts and particle scrubbing devices in devices for the purification of exhaust gas.

It is known from prior art, for example, that a metal foil body made of corrugated and smooth layers of metal foil can be wound up, secured to one another, and attached to a cylindrical jacket that surrounds the winding body. Thus, depending on the nature of the surface structure of the individual layers and on the configuration of the adjacent metal foils, flow channels result through which the exhaust gas flows through the metal foil body. In most cases, the metal foils are coated with a coating that increases the specific surface or with a precious metal coating.

The metal foil bodies in the form of a winding body are preferably employed in the particle scrubbing devices used for the purification of exhaust gas in internal combustion engines for the deposition of carbon particles and as carriers for catalysts, in particular for gaseous emissions from diesel or gasoline engines.

When the metal foil body is used as a catalyst carrier, a conversion process for the purification of the exhaust gas takes place while the gases pass through the flow channels. By deflecting and turbulently mixing the exhaust gas, it is possible to increase the contact of the exhaust gas with the walls and the catalytically active coatings applied to said walls and required for the conversion process.

When the metal foils are used for the deposition of carbon particles, the deflection and the turbulence lead to a change in the direction and speed of the flow of the exhaust gas and, by means of diffusion and impaction, enable a removal of the particles from the flow and a deposition of the particles in the areas facing away from the flow.

For metal foils of this type, different surface structures and different configurations of the metal foils and combinations with smooth foils are used to ensure a suitable turbulence.

It is generally known from prior art that generic metal foils can be created in the form of corrugations or folds, with the creation of a varied surface topography by means of peaks and valleys which optionally also has openings.

The German Patent 20117873 U1 discloses a filter body for the purification of exhaust gas, which filter body is made of a foil with a structure which has elevations and troughs, with paddles being arranged in the elevations and troughs. The elevations and troughs are oriented in the longitudinal direction which runs parallel to the direction of the main flow, i.e., the corrugations run at right angles to the direction of the main flow. The paddles in combination with a paddle entry and a paddle exit form a passage for creating flow channels and enable the exhaust gas stream to pass over into adjacent layers of the filter body.

The German Patent 3744265 C2 describes a particulate filter for the purification of exhaust gas with a structure of the type described above, in which a layer of corrugated or pleated sheet steel and a layer of a plane filter material are alternatingly wound or stacked to form a winding body or package. In this case, the layer of corrugated or pleated material has a structure consisting of peaks and valleys that are alternatingly arranged side by side in the direction of the main flow and of joining strips that are arranged at a certain distance from one another at right angles to the direction of the main flow. These joining strips always run across the entire layer and at a constant height level. For joining strips that are located on the valley height level, there is a constant-height connection between the joining strip and the upstream and downstream valleys which are adjacent to said joining strip and which are arranged between the peaks in the direction of the main flow. By analogy, for joining strips that are located on the peak height level, there is a constant-height connection between the joining strip and the upstream and downstream peaks that are adjacent to said joining strip in the direction of the main flow. Thus, in the direction of the main flow, there are sections with a direct constant-height connection between the peaks and the valleys. The joining strips that run at right angles at the valley height level have only an insignificant effect on the change of the direction of flow and the flow velocity of the exhaust gas since the exhaust gas is not subjected to a direct forced deflection. Overall, there is little room for the deposition of particles since the cross section of the flow channel, both from the standpoint of the individual metal foil layers and from the standpoint of the entire body, contains only few zones of disturbance and, instead, has a relatively uniform contour. The greatest turbulence is achieved by a deflection [of the exhaust gas] into adjacent layers, which requires an extremely accurate placement of the layers with respect to one another so as to ensure a sufficiently large cross section for the passage [of the exhaust gas] into the adjacent layers. Overall, the flow channels that form promote a smooth flow and generate little turbulence since only few leading edges that deflect the flow are present; instead, said flow channels have sloped guide surfaces that give the flow a specific direction. As a result, this also leads to few "leeward" zones in which the flow is calmer, which is a prerequisite for the deposition [of particles].

SUMMARY OF THE INVENTION

Thus, the problem to be solved by the present invention is to make available a metal foil for use in the purification of exhaust gas which has a surface structure suitable for improving the turbulence of the exhaust gas and, at the same time, creates potential surfaces for the deposition of particles contained in the exhaust gas stream.

The problem is solved according to the present invention in that, in the direction of the main flow, the peaks and valleys are divided in rows and that the peaks and valleys of adjacent rows are staggered in the direction of the main flow with respect to one another in such a way that the ascending flanks and the descending flanks of the peaks that are arranged so as to be staggered with respect to one another form a trough which connects valleys that are arranged so as to be staggered with respect to one another. This staggered configuration of adjacent rows creates a chessboard-like configuration of peaks and valleys and thereby ensures short flow paths in the direction of the main flow, sections of which are undisturbed. The direction of the main flow here identifies the direction of the exhaust gas stream that prevails upstream of the metal foil before said exhaust gas stream impinges on the metal foil. Each peak has a highest point, which can be point-shaped or linear or have a flat surface, with surrounding flanks or slopes which are arranged at right angles to the direction of the main flow and which establish a connection to the surrounding valleys. By analogy, each valley has a lowest point which can be point-shaped or linear or have a flat surface. The ascending and descending flanks are here identified as "leeward" and "windward" flanks relative to the direction of the main flow. For the major application, the crests of the peaks are oriented parallel to the direction of the main flow. But the metal foil can also be used when the direction of the main flow is oriented diagonally or at right angles to the orientation of the crests of the peaks. All flanks can have different slopes, but it was found that a steeper slope of "leeward" descending flanks has an especially favorable effect on the deposition of particles.

The trough that forms as a result of the staggering of adjacent rows between peaks that are arranged so as to be staggered with respect to one another runs from a peak of a first row along the descending flank of said peak and over the ascending flank of a staggered peak that is located in the second row adjacent to the first row. The trough thus allows the local adjacent downstream and upstream valleys to be connected. The direction of flow locally prevailing in the region downstream and upstream of the trough can differ from the direction of the main flow and, as a rule, runs diagonally to the direction of the main flow. The cross section available for the passage of the exhaust gas from one valley via the trough into the adjacent downstream valley is determined by the measure of offset of the adjacent rows. The vertical position of the lowest point of the trough is located below the highest point of the ascending and descending flank that forms the trough and at the height or above the height of the valleys adjacent to the trough. If the descending flank of a peak is arranged at a certain distance from an ascending flank of an adjacent peak, which ascending flank, relative to the direction of the main flow, is located downstream thereof, a constant-height connection of the valleys—that are staggered with respect to one another—of the adjacent rows is possible.

The irregular transition zones between the ascending and descending flanks, with the formation of the troughs and the chessboard-like configuration of the peaks and valleys, thus allow an improved turbulence of the exhaust gas because of the lateral or diagonal deflection and, depending on the measure of offset in the adjacent rows, also a vertical deflection across the troughs. The troughs present in the region of the descending and ascending flanks form irregular zones of disturbance and warps for turbulently mixing the exhaust gas and bringing said gas into contact with the surface. In addition, downstream of the trough and within the regions facing away from the air, the embossed structure of the metal foil offers spaces favorable to the deposition of particles contained in the exhaust gas stream.

To deflect and turbulently mix the exhaust gas, channels are provided which ensure an increased contact between the exhaust gas and the surface of the structure as well as an increased degree of particle separation. The cross sections of flow are dimensioned to ensure that no undesirable increase in the exhaust gas counterpressure occurs and that the efficiency of the internal combustion engine is not decreased.

The term "metal foil" as used in the context of the present invention denotes unperforated and perforated metal foils, sheet metal, expanded metals, nonwoven fabrics, and fiber materials, and these materials may also be coated with a catalytic coating. The perforation also includes any cutouts made in the metal foil. Preferably, these cutouts have a size of 100 to 500 µm. In the context of the present invention, this material is collectively referred to by the term "metal foil."

A preferred embodiment provides that the ascending flanks and/or the descending flanks are designed so as to have a trapezoid shape. This makes it possible to influence the shape of the trough in and at right angles to the direction of the main flow and thus the cross section of the free space that forms for the passage of the exhaust gas.

Another preferred embodiment provides that the ascending and/or descending flank has a minimum of one opening. In addition, it is also possible to provide for several openings in an ascending/or descending flank, and the openings of different ascending and/or descending flanks can have different configurations. The regions of the ascending and/or descending flanks adjacent to the openings can have an irregular shape, they can have different slopes, and they can be curved inward or outward.

In still another preferred embodiment, the opening takes up practically the entire area of the ascending flank ($4a,4b$) and/or the descending flank ($5a,5b$).

It is useful for the opening to have an arched boundary edge. The boundary edges can also be designed to have, for example, a linear, slot-like, or arched, elliptical, semicircular, or circular shape.

In another preferred embodiment, the ascending flanks and/or the descending flanks are completely open.

In all above-mentioned embodiments that have an opening, it is possible for the exhaust gas to pass into adjacent layers. An advantage is that in addition to the generation of turbulences and the deflection of the exhaust gas at right angles to the direction of the main flow, additional flow channels and leading edges are created in the adjacent layers of the filter or catalyst body, thus causing an interruption and/or deflection of the flow lines of the exhaust gas.

It is useful if bead-like regions which form troughs are provided on the ascending flanks and/or descending flanks. These bead-like regions can also merge into the region of the ascending flanks and descending flanks that are sloped at right angles to the direction of the main flow or at right angles to the crest of the peaks. The shape of the bead-like regions is determined by the dimensions and slopes of the peaks, valleys, ascending flanks and descending flanks and the distance between these, with the possibility of the bead-like regions having a soft, rounded shape or an angular, pleat-like shape.

It is also useful to provide for depressions between the bead-like regions. These hollows or honeycomb-like indentations create spaces suitable for the deposition of particles contained in the exhaust gas.

Another benefit is obtained when a granulated catalyst is present in the depressions. The bead-like regions along the edges of the depressions offer anchoring means and spaces suitable for holding, for example, round granules. Thus, for example, the granules are wedged between the lateral bead-like regions of the depressions. It is also possible to use granules with different types of coatings.

An improved turbulence can also be obtained by providing the peaks and/or valleys with different heights. According to another embodiment, the peaks and/or valleys have different lengths and/or widths. The variation of the dimensions generates the desired turbulences during the passage [of the exhaust gas] through the metal foil and requires a lower level of accuracy in the manufacture of the metal foil.

It is also useful if the peaks and valleys are designed so as to have the shape of a plateau. This shape describes a rectangular, rounded-off, or elliptical, substantially plane circumscribed area which is bounded in and at right angles to the direction of the main flow by an ascending flank and a descending flank. The plateau-like peaks and valleys can serve as support surfaces and as spacers when the metal foil is wound up or when a combination of additional metal foils is used.

Alternative embodiments provide for the peaks and valleys to have the form of corrugations or jags.

Another preferred embodiment of the present invention provides that on the exhaust gas inlet end and/or the exhaust gas outlet end, the peaks and valleys are designed so as to run diagonally to the direction of the main flow. This makes it possible for the exhaust gas to be directed at the inlet end in a manner diagonal to the direction of the main flow and to be discharged at a sloped angle on the outlet end of the metal foil. This is especially beneficial in situations in which the space upstream and downstream of the metal foil is limited.

If a combination of several metal foils is used, the peaks and valleys along the exhaust gas inlet end and/or the exhaust gas outlet end can be oriented in the same direction or in opposite directions. Thus, in addition to deflecting the exhaust gas stream, a turbulent mixing of the exhaust gas stream upstream and downstream of the metal foil can be achieved.

The metal foil can comprise one or a plurality of layers and can be stacked into a stack or wound so as to form a winding body and can preferably be enclosed in a jacket. If the metal foil with an embossed structure is combined with a smooth layer, various configurations can be chosen. In a configurations with two adjacent metal foils according to the present invention and one smooth metal foil in between, the two adjacent metal foils according to the present invention can contact the smooth layer in the same or in staggered regions. The smooth layer can have openings and/or elevations. Preferably, the openings are slotted openings cut into the bump-like elevations and oriented at right angles to the direction of the main flow. In a combined configuration with the metal foil according to the present invention, it is useful if the openings in the elevations of the smooth layer come to lie in the region of the peaks of the structured metal foil.

The problem is further solved by providing that a metal foil with an embossed structure for use in the purification of exhaust gas is at least partially coated with a granular coating. This also applies to the metal foil described earlier. Such a coating offers several advantages. First, the predominantly irregular surface structure of the granular coating leads to an increase in the surface. As a result, the flow boundary layer of the exhaust gas flowing along the surface is disrupted, as a result of which turbulences are generated. Secondly, some of the exhaust gas also flows into and through the porous structure of the granular coating. In the course of this, for example, carbon particles settle in the pores of the granular coating. When different grain sizes are used, for example, grain sizes that are graduated in the direction of the main flow, this additional filter effect can be controlled, and the formation of filter cakes can be avoided.

In a preferred embodiment of the present invention, the ascending flanks and/or the descending flanks are at least in part coated with a granular coating since it is these areas on which the exhaust gas stream impinges with the greatest force. The flanks can be both on the lower surface and on the upper surface of the metal foil. In principle, all areas of the metal foil can be coated with the granular coating, and this granular coating can have different layer thicknesses and/or grain sizes. The materials of the granular coating can have a fibrous, grainy, or powdery structure and can have grain sizes in a range from 25 to 400 $\mu m$, preferably in a range from 50 to 250 $\mu m$.

According to another embodiment of the present invention, the granular coating used is a granular powder that comprises at least one metal and/or at least one mineral substance.

It is advisable for the metal substance in the granular powder to be a sintered metal. If the granular powder used is a granulated powder purely out of metal, such as a sintered metal, with the addition of mineral substances, the granules, under suitable climatic conditions, can enter into a bond with one another and with the metal foil. If a granular powder that comprises metal and mineral substances or a purely mineral granular powder is used, it is advisable that a soldering metal be added to the granular powder. This soldering metal is needed for bonding the granules and for securing the granular coating to the metal foil. In another preferred embodiment, the granular coating is sintered to the metal foil.

In addition, the problem is solved in that a filtering device is provided, which is constructed from alternating layers of the metal foil according to the present invention and a smooth foil. The smooth foil can be perforated and can be made of a metal, a sheet metal, an expanded metal, a nonwoven fabric, and a fiber material, and these materials can also be coated with a catalytic coating. It is useful if the metal foil and/or the smooth foil comprise a plurality of layers. It is also advisable that the metal foil and/or the smooth foil be made of an expanded metal and have several layers of different mesh sizes. It is especially favorable if the different layers have a mesh size which, relative to the spiral body, decreases radially from the outside toward the inside. Thus, one layer has a substantially constant mesh size, and one layer that is radially located further on the inside has a mesh size smaller than that of the previously mentioned layer.

The manufacture of the metal foil according to the present invention is made possible by a tool with a pair of toothed rolls, wherein the distance between the teeth of the roll at right angles to the circumferential direction of the roll is dimensioned in such a way that in the embossing step during which the ascending flanks and the descending flanks are formed, the material is able to avoid the teeth of the roll and that the rotational axis of the roll runs parallel to the direction of the main flow. If the teeth of the roll are suitably designed and distanced from one another, the embossing will cause sections of the material to targedly form bulges from the excess material in the region of the ascending flanks and the descending flanks, which bulge formation is in part controllable. In this manner, the ascending flanks and the descending flanks can, to an extent, be freely deformed to form the troughs. The irregular deformation also depends on the local material quality, local deformation properties, and on the shape and pressure of the teeth of the roll. The segments of the surface topography located in the region of the ascending flanks and the descending flanks can form in the shape of beads, folds, grooves, slots, incisions, and hollows and in the shape of indentations, bulges, and warps. Because of this topography which, within limits, is irregular and which promotes turbulence, the manufacturing method requires a considerably lower level of accuracy than those previously used.

To create the openings, it is recommended that the teeth of the roll have sharp-edged protrusions. It is advisable that, relative to the rotational axis of the roll, the sharp-edged protrusions radially taper to a point in an outward direction and/or have a triangular or conical shape. By making available such a tool, it is now possible to produce the metal foil according to the present invention in one single operation.

As to the method, the problem is solved in that during embossing, the sharp-edged protrusions first make slits or cuts in the metal foil and that the teeth of the roll subsequently shape the openings and the structure. The slit or cut made with the sharp-edged protrusions may initially be only a fraction of the final dimensions and can serve to help in the creation of the final opening. In the course of the embossing step, the openings and the structure are subsequently shaped by the teeth of the roll which tear and push away the material in a targeted and controlled manner. Alternatively, several layers of the metal foil can also be first arranged on top of one another, and the embossing step can be carried out thereafter. The metal foil used can also be made of an expanded metal with different mesh sizes. When winding [the metal foil] to form a spiral body, it is especially advisable to have the mesh size decrease radially from the outside toward the inside.

In the production of a metal foil with an embossed structure, the problem is furthermore solved in that an adhesive coating is applied to at least part of the metal foil, that subsequently a granular coating is applied to at least part of the metal foil, and that the metal foil is subsequently wound up. In this case, the adhesive coating should be applied at least to those regions to which the granular coating is to be applied.

Alternatively, first the metal foil is wound up, subsequently, the adhesive coating is applied to at least part of the metal foil and next, the granular coating is applied to at least part of the metal foil.

The granular coating and the adhesive coating can also be applied at the same time. For this purpose, it is best to use a spraying method.

According to another alternative production method, the adhesive coating is first applied to at least part of the metal foil, subsequently, the metal foil is wound up, and next, the granular coating is applied to at least part of the metal foil. Both the adhesive coating and the granular coating can be sprayed on. Instead of an adhesive substance, it is also possible to use binders or other materials to bond the granular structure and to affix the granular coating to the metal foil.

Alternatively, the granular coating can be poured or vaporized onto the metal foil either prior to or after winding up the metal foil.

The granular coating can also be affixed to the metal foil by compaction, for example, by means of pressure or compression. After the granular coating has been applied, the excess granular material or granular powder can be removed, for example, by subjecting the metal foil to a shaking or vibrating motion or by blowing the excess material off.

According to another preferred manufacturing method, the granular coating is applied to the metal foil by means of sintering. In this case, the granular coating can be applied to the metal foil prior to or after winding up said metal foil, and the winding body can subsequently be baked or sintered in a sintering furnace.

To produce the final winding body, the layers of the metal foil are at least partially soldered. Preferably, soldering the individual layers together and sintering the granular coating onto the metal foil take place in one single operation. It is advisable that during this working step, the climatic conditions, in particular the temperature, are maintained constant.

The two solutions proposed for the production of the metal foil can be combined, and the sequence in which the individual processing steps are carried out can vary. The manufacturing methods mentioned can be used to produce any of the metal foils described. For example, immediately after the metal foil has passed through the embossing roll, it can be coated with the adhesive coating and at the same time or at a later time with the granular coating. As with embossing, coating the metal foil with the granular coating in most cases does not require a high level of accuracy since different thicknesses of the granular coating also contribute to an increased turbulence of the exhaust gas stream. Thus, combining several working steps makes possible an inexpensive automated production.

BRIEF DESCRIPTION OF THE DRAWINGS

This invention will be explained in greater detail below on the basis of several practical examples in which reference is made to the attached drawings. As can be seen from the diagrammatic representations:

FIG. 1a shows a perspective view of a first configuration with a peak with ascending flanks and descending flanks and a valley of two adjacent staggered rows;

FIG. 1b shows a perspective view of a second configuration of two adjacent rows as shown in FIG. 1 [sic; 1a] with openings in the ascending flanks;

DESCRIPTION OF THE PREFERRED EMBODIMENT

Figure 2:
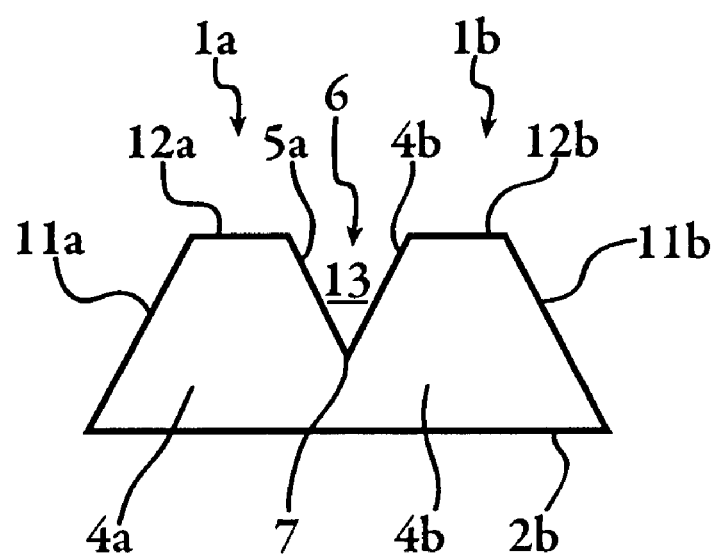
FIG. 2 shows the configuration seen in FIG. 1 in a view in the direction of the main flow.

FIG. 1a shows a perspective view of a section of one embodiment of a metal foil with an embossed structure. In a first row, one can see peak 1a with trapezoid ascending flanks 4a, 11a and trapezoid descending flanks 5a,10a and a valley 2a which, relative to the direction of the main flow indicated by arrow 3, is located downstream of peak 1a. Ascending flank 4a which is located upstream of plateau 12a and descending flank 5a which is located downstream of plateau 12a have slopes which have the same inclination but face in different directions. Ascending flank 11a and descending flank 10a which are oriented at right angles to the direction of the main flow also have a trapezoid shape and a slope with identical inclination and also face in the opposite direction.

The second row which is located parallel to the direction of the main flow 3 and staggered relative to the first row has similar elements as the first row described earlier. Peak 1b is formed by plateau 12b and the trapezoid ascending flanks 4b,11b and the trapezoid descending flanks 5b,10b. In this practical example, peaks 1a and 1b have the same height H, the same length L, and the same width B. In contrast to the first row, valley 2b here is located in the direction of the main flow upstream of peak 1b. Because of the staggered configuration of the adjacent rows, trough 6 is formed by descending flank 5a and ascending flank 4b. Thus, low point 7 of trough 6 comes to lie at a height level between the highest point of ascending flank and descending flank 5a and 4b [sic], respectively, which form the trough and above the height level of valleys 2a and 2b that are adjacent to trough 6.

When viewed in the direction of the main flow 3, trough 6 thus runs from the height level of plateau 12 of peak 1a down the slope and at an oblique angle to the direction of the main flow along descending flank 5a up to low point 7 and from there further on at an oblique angle to the direction of the main flow up the slope along ascending flank 4b up to plateau 12b of peak 1b.

The surface topography which in the drawings is represented partly as straight lines and the transitions between the linear sections are here shown in a simplified representation and can also have a rounded-off or arched shape instead.

Thus, free space 13 which is enclosed by trough 6 and an imagined connection between plateau 12a and 12b forms a passage for the exhaust gas for passing from valley 2b via trough 6 into valley 2a. As the exhaust gas passes through free space 13, the flow filaments of the local direction of flow are deflected or interrupted. At this time, a desired disruption of the boundary layer that is present in the region of the walls can occur so that a relatively large part of the gas stream comes into contact with the walls. The different pressure conditions that develop in the cross sections of the flow lead to local suction effects especially downstream of trough 6. These effects promote a separation of the particles contained in the exhaust gas stream and thus promote the deposition of the particles especially on the "leeward" side of trough 6. In the region in which ascending flanks and descending flanks 4b and 5a, respectively, meet, bead-like regions, pleat-like warps and bulges can form. The surface topography in the region of the ascending flanks and the descending flanks is determined by the fact that as a result of the excess material, a substantially uncontrolled bulging of the material takes place. Thus, to form the troughs, the ascending flanks and the descending flanks can, up to a point, be freely deformed. Between these regions that connect the adjacent peaks and valleys, honeycomb-like indentations and depressions that can suitably serve to hold a granulated catalyst can be present.

FIG. 1b shows a perspective view of a different embodiment of a section of metal foil with an embossed structure which has two adjacent rows as seen in FIG. 1a and openings in the ascending flanks. Thus, an opening 20a is present in ascending flank 4a, and an opening 20b is present in ascending flank 4b. The border edges of openings 20a and 20b are arched but they can also have other shapes, such as linear, elliptical, circular, and other irregular shapes. These openings 20a and 20b take up a maximum of the area of ascending flank 4a and 4b, respectively, and are fashioned as recesses, for example, by means of stamping or making a slot or by cutting, with subsequent deformation. For example, after making a cut in the area of ascending flanks 4a and 4b and after pushing ascending flank 4a and 4b into the direction of the direction of the main flow as indicated by arrow 3, an arched opening can be obtained as a result of the arcuate deformation.

According to another embodiment (not shown), ascending flanks 4a and 4b are completely open. Otherwise, the structure is the same as that shown in FIG. 1a. Thus, peaks 1a and 1b are open on one side at the end that faces upstream. As a result, part of the exhaust gas which flows in the direction of arrow 3 can flow into the peak and downward into another layer. Immediately after flowing into the opening and at the latest after impinging on descending flanks 5a and 5b, the exhaust gas flows downward. At peak 1a, the opening is formed, for example, by the edges of the upstream end of flanks 10a and 11a and of plateau 12a. This gate-like opening can also have the shape of an arch and especially of a cupola.

In the following explanations of FIGS. 2, 3, and 4, elements identical to those in FIGS. 1a and 1b have the same reference characters.

In FIG. 2, the configuration seen in FIG. 1a is shown from a view in the direction of the main flow as indicated by arrow 3. Because of the irregular shape of the troughs, the free space 13 between the adjacent rows can have different cross-sectional shapes and sizes both in and at right angles to the direction of the main flow.

Figure 3:
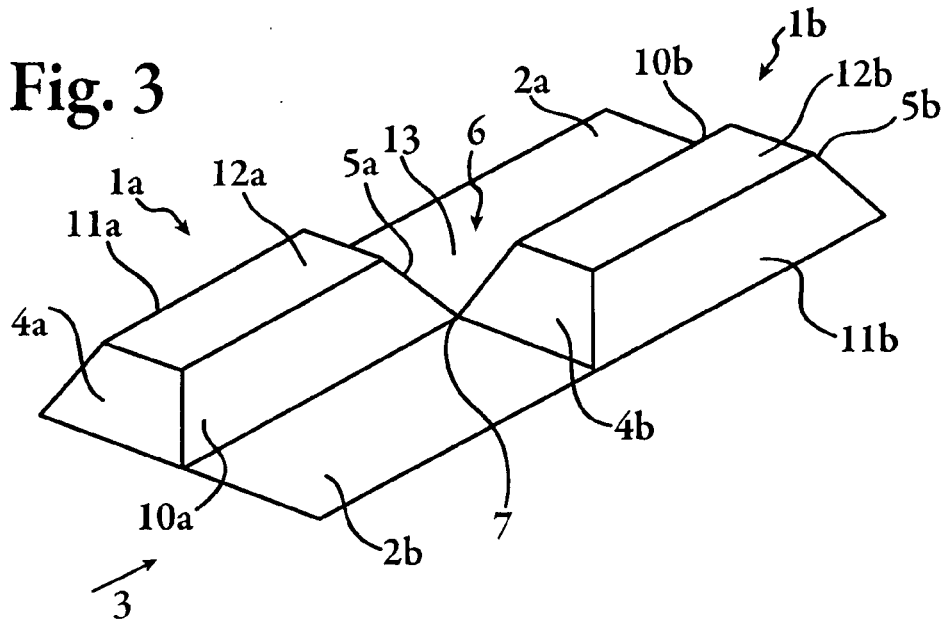
FIG. 3 shows a perspective view of a third configuration of two adjacent rows as shown in FIG. 1 with a different measure of offset.

FIG. 3 shows a perspective view of a second configuration of two adjacent rows which are staggered in a manner different from that seen in FIG. 1a. In this case, the offset selected ensures that low point 7 of trough 6 comes to lie at the height level of valley 2a and valley 2b.

Figure 4:
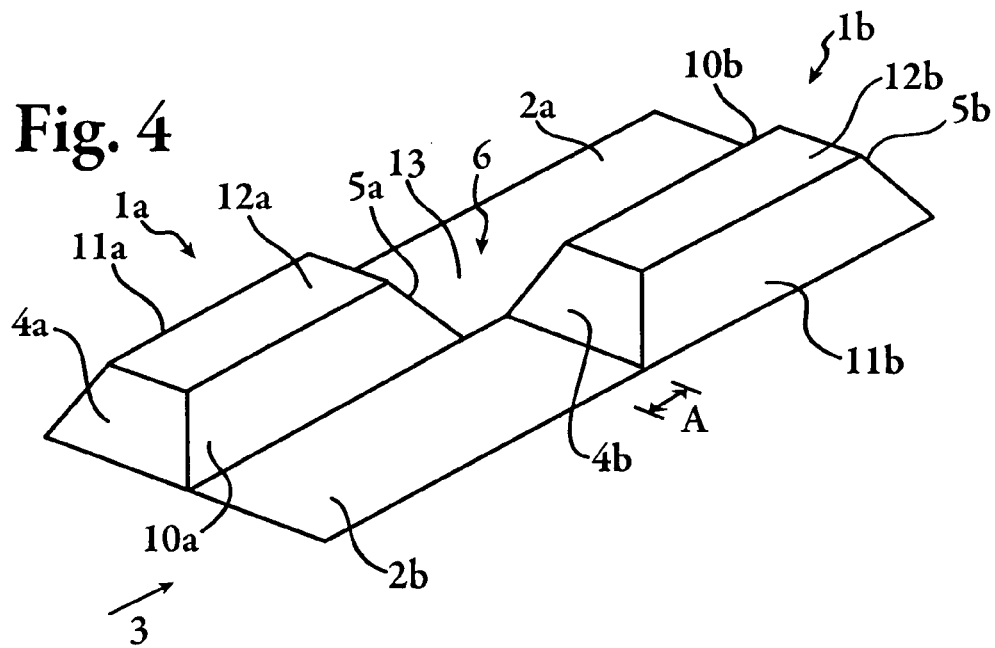
FIG. 4 shows a perspective view of a fourth configuration of two adjacent rows as seen in FIG. 1 with yet another measure of offset.

FIG. 4 shows a perspective view of a third configuration of two adjacent rows with yet another offset. The offset selected in this case ensures that ascending flank 4b of peak 1b, in the direction of the main flow, is located at a distance from descending flank 5a of peak 1a. The lowest point of trough 6 extends in a straight line across a certain distance A in the direction of the main flow and is located at the height level of valley 2a and 2b. As a result, a larger free space 13 with a more pronounced hollow as a transition to valleys 2a and 2b is now available.

If the metal foil is made of an expanded metal or a perforated metal sheet, an additional mixing of the exhaust gas in the vertical direction is achieved. In a multilayered configuration, the flow of the exhaust gas stream is diverted into other adjacent layers.

Figure 5:
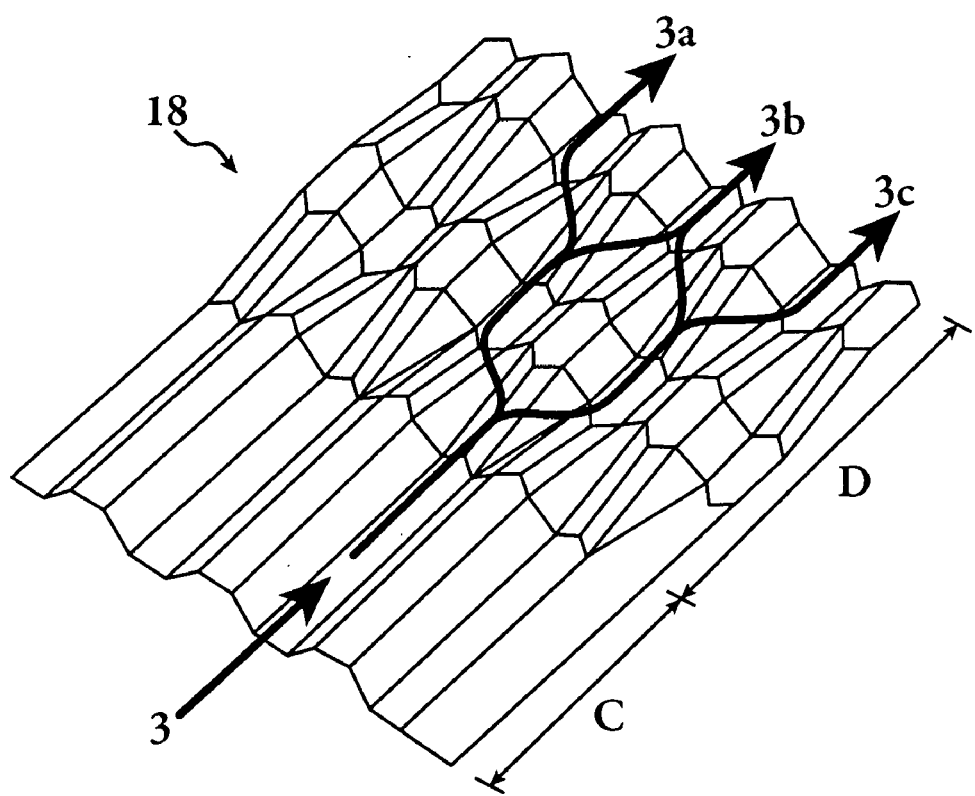
FIG. 5 shows a perspective view of a section of a metal foil.

FIG. 5 shows a perspective view of a section of a metal foil. In this figure, metal foil 18 is only diagrammatically shown without a detailed view of the troughs. In region C of the side of the metal foil for the exhaust gas inlet, the peaks and valleys that are adjacent to one another in the direction of the main flow are arranged in the direction of the main flow so as to extend over a long distance in a straight line and substantially at the same height. This region is especially suitable for being coated with a catalytically active coating. Region D has the structure of the metal foil according to the present invention. In addition, one section of FIG. 5 also illustrates a potential initial flow and the subsequently possible flow patterns along metal foil 18. After flowing through region C of metal foil 18, the direction of the main flow as indicated by arrow 3 is divided into the local directions of flow 3a, 3b, and 3c.

Figure 6:
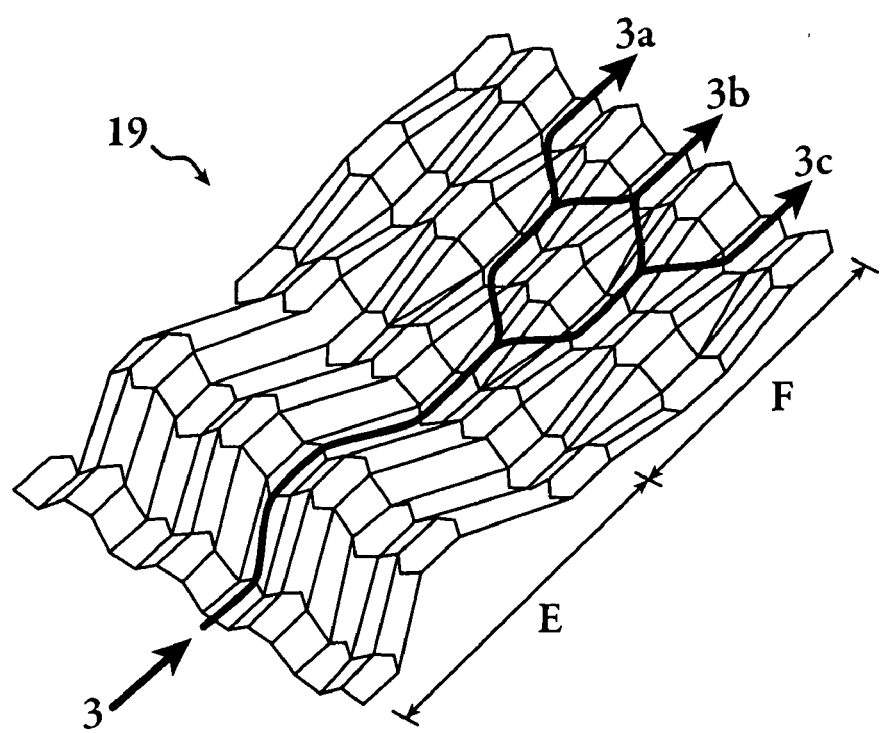
FIG. 6 shows a perspective view of a section of another metal foil.

In FIG. 6, a perspective view of a segment of yet another metal foil is shown. As in FIG. 5, metal foil 19 is only diagrammatically shown and can be partially or completely coated with a catalytically active coating. In region E of the side of the metal foil for the exhaust gas inlet, sections of the peaks and valleys which, in the direction of the main flow, are located so as to be adjacent to one another extend in a straight line in and at an oblique angle to the direction of the main flow and have the shape of a horizontal and tilted wave. Region F has the structure of the metal foil according to the present invention. After the exhaust gas has flown through region F, the direction of the main flow indicated by arrow 3 is divided into the local directions of flow 3a, 3b, and 3c.

Figure 7:
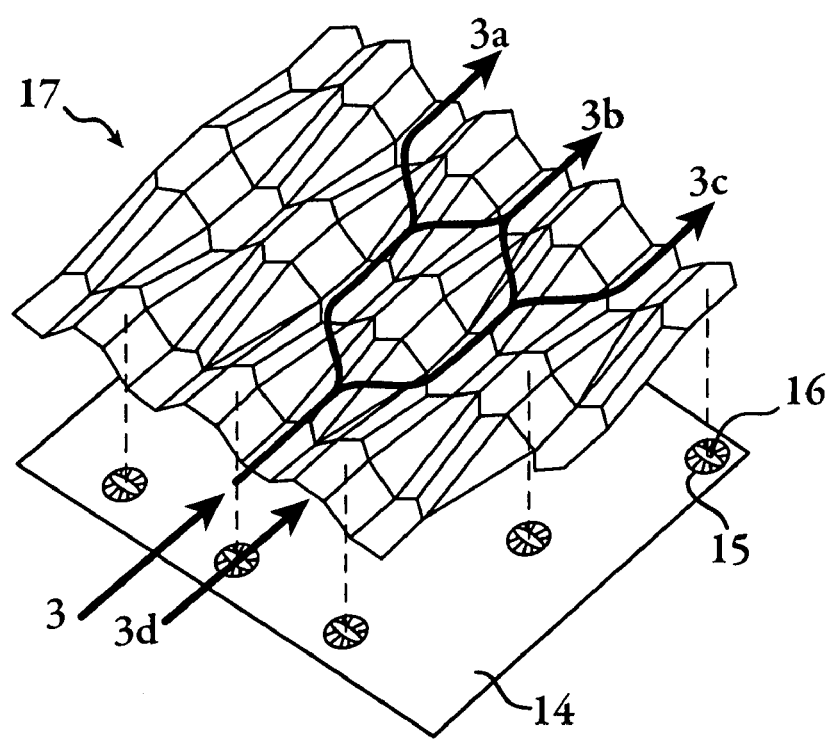
FIG. 7 shows a perspective view of a section of a combined configuration of the metal foil according to the present invention with a smooth layer that has openings and elevations.

FIG. 7 shows a perspective view of a section of a combined configuration of the metal foil according to the present invention and a smooth layer that has openings and island-like elevations. In this figure, metal foil 17 according to the present invention is only diagrammatically shown without a detailed view of the troughs. Smooth layer 14 also consists of a metal foil which has bump-like elevations 15 with slot-like openings 16 which are arranged at right angles to the direction of the main flow. The arrangement of the smooth layer 14 is selected so that openings 16 in elevations 15 come to lie in the region of the peaks of the metal foil 17 according to the present invention. In addition, FIG. 7 shows sections of a potential initial flow of the exhaust gas toward metal foils 14 and 17 and a subsequent possible flow pattern of the exhaust gas along metal foils 14 and 17. After the exhaust gas impinges on metal foil 17, the direction of the main flow indicated by arrow 3 is divided into the local directions of flow 3a, 3b, and 3c. The combined configuration with the smooth layer makes it possible for the partial stream 3d which enters at the front end between metal foil 17 and metal foil 14 to pass through openings 16 into adjacent layers.

What is claimed is:

1. Metal foil with an embossed structure for use in the purification of exhaust gas having a main flow direction, with alternating peaks with ascending flanks and descending flanks and valleys in the direction of the main flow wherein the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered with respect to one another form a trough which connects the staggered valleys, wherein the ascending flank and/or the descending flank have a minimum of one opening.

2. The metal foil as claimed in claim 1, wherein the ascending flanks and/or the descending flanks have a trapezoid shape.

3. The metal foil as claimed in claim 1, wherein the opening takes up substantially the entire area of the ascending flank and descending flank.

4. The metal foil as claimed in claim 1, wherein the opening has an arched border edge.

5. Metal foil with an embossed structure for use in the purification of exhaust gas having a main flow direction, with alternating peaks with ascending flanks and descending flanks and valleys in the direction of the main flow wherein the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered with respect to one another form a trough which connects the staggered valleys, wherein the ascending flanks and/or the descending flanks are completely open.

6. The metal foil as claimed claim 5, wherein bead-like areas which form the troughs are formed on the ascending flanks and or descending flanks.

7. The metal foil as claimed in claim 6, wherein depressions are located between the bead-like areas.

8. The metal foil as claimed in claim 7, wherein a granulated catalyst is placed into the depressions.

9. Metal foil with an embossed structure for use in the purification of exhaust gas having a main flow direction, with alternating peaks with ascending flanks and descending flanks and valleys in the direction of the main flow wherein the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered, wherein the peaks and/or valleys have different heights.

10. Metal foil with an embossed structure for use in the purification of exhaust gas having a main flow direction, with alternating peaks with ascending flanks and descending flanks and valleys in the direction of the main flow where the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered wherein the peaks and valleys have different lengths and/or widths.

11. The metal foil as claimed in claim 10, wherein the peaks and valleys have the shape of a plateau.

12. The metal foil as claimed in claim 10, wherein the peaks and valleys have the shape of corrugations.

13. Metal foil with an embossed structure for use in the purification of exhaust gas having a main flow direction, with alternating peaks with ascending flanks and descending flanks and valleys in the direction of the main flow wherein the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered with respect to one another form a trough which connects the staggered valleys, wherein the peaks and valleys have the shape of a cupola.

14. Metal foil with an embossed structure for use in the purification of exhaust gas having a main flow direction, with alternating peaks with ascending flanks and descending flanks and valleys in the direction of the main flow wherein the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered with respect to one another form a trough which connects the staggered valleys, wherein the peaks and valleys have a pointed shape.

15. The metal foil as claimed in claim 14, wherein on the side of the exhaust gas inlet and/or exhaust gas outlet, the peaks and valleys are oriented at an oblique angle with respect to the direction of the main flow.

16. The metal foil as claimed in claim 14, wherein in the region of the side of the exhaust gas inlet and/or exhaust gas outlet, extended peaks and valleys which, relative to the direction of the main flow, run side by side in a straight line and essentially at the same height level are located.

17. The metal foil as claimed in claim 14, wherein in the region of the side of the exhaust gas inlet and/or exhaust gas outlet, peaks and valleys which, in and obliquely with respect to the direction of the main flow, run side by side and in certain sections in a straight line are located.

18. The metal foil as claimed in claim 14, wherein the foil comprises a plurality of layers.

19. Metal foil with an embossed structure for use in the purification of exhaust gas having a main flow direction, with alternating peaks with ascending flanks and descending flanks and valleys in the direction of the main flow wherein the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered with respect to one another form a trough which connects the staggered valleys, wherein the foil is at least in part coated with a granular coating.

20. The metal foil as claimed in claim 19, wherein the ascending flanks and/or the descending flanks are at least in part coated with the granular coating.

21. The metal foil as claimed in claim 19, wherein the granular coating has different coating thicknesses.

22. The metal foil as claimed in claim 19, wherein the granular coating is sintered onto the metal foil.

23. The metal foil as claimed in claim 19, wherein the granular coating used is a granular powder which comprises a minimum of one metal and/or a minimum of one mineral substance.

24. The metal foil as claimed in claim 23, wherein the granular powder comprises a sintered metal as the metal substance.

25. The metal foil as claimed in claim 23, wherein the granular powder also comprises a soldering metal.

26. A filtering device for use in the purification of exhaust gas, constructed alternatingly of a metal foil, with an embossed structure for use in the purification of exhaust gas having a main flow direction, with alternating peaks with ascending flanks and descending flanks and valleys in the direction of the main flow wherein the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered with respect to one another form a trough which connects the staggered valleys, and a smooth foil.

27. The filtering device as claimed in claim 26, wherein the metal foil and/or the smooth foil comprise several layers.

28. The filtering device as claimed in claim 27, wherein the metal foil and/or the smooth foil are made of an expanded metal and comprise various layers with different mesh sizes.

29. Metal foil with an embossed structure for use in the purification of exhaust gas having a main flow direction, with alternating peaks with ascending flanks and descending flanks and valleys in the direction of the main flow wherein the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered with respect to one another form a trough which connects the staggered valleys, wherein an adhesive coating is applied to at least part of the metal foil, that subsequently a granular coating is applied to at least part of the metal foil, and that the metal foil is subsequently wound up.

30. The metal foil as claimed in claim 29, wherein first the metal foil is wound up, that the adhesive coating is subsequently applied to at least part of the metal foil and that subsequently the granular coating is applied to at least part of the metal foil.

31. The metal foil as claimed in claim 29, wherein the granular coating is applied at the same time as the adhesive coating is applied.

32. The metal foil as claimed in claim 29, wherein the adhesive coating and/or the granular coating are/is sprayed on.

33. The metal foil as claimed in claim 29, wherein the granular coating is poured on.

34. The metal foil as claimed in claim 29, wherein the granular layer is applied by means of vaporization.

35. The metal foil as claimed in claim 29, wherein the granular coating is compacted.

36. The metal foil as claimed claim 29, wherein after application of the granular coating, the excess material of the granular coating is shaken off.

37. The metal foil as claimed in claim 29, wherein the granular coating is sintered on or soldered on the metal foil.

38. The metal foil as claimed in claim 29, wherein the layers of the metal foil are at least in part soldered to one another.

39. The metal foil as claimed in claim 29, wherein the steps of soldering together the layers of the metal foil and of sintering the granular coating onto the metal foil are carried out in one single operation.

40. Metal foil with an embossed structure for use in the purification of exhaust gas having a main flow direction, with alternating peaks with ascending flanks and descending flanks and valleys in the direction of the main flow wherein the peaks and valleys are divided into rows parallel to the direction of the main flow and that, in the direction of the main flow, the peaks and valleys of adjacent rows are staggered with respect to one another in such a manner that the ascending flanks and descending flanks of the peaks that are staggered with respect to one another form a trough which connects the staggered valleys, wherein an adhesive coating is applied to at least part of the metal foil, that the metal foil is subsequently wound up, and that a granular coating or a granular powder is subsequently applied to at least part of the metal foil.

* * * * *